United States Patent
Boies et al.

[11] Patent Number: 6,138,160
[45] Date of Patent: Oct. 24, 2000

[54] SYSTEM WITH WAKE UP SERVER AND WAKE UP MONITOR FOR FACILITATING DIAL UP CONNECTION BETWEEN TWO APPLICATION PARTNERS VIA INTERNET

[75] Inventors: Stephen Joy Boies, Mahopac, N.Y.;
Stephen Eric Levy, Saskatoon, Canada;
Michael J. Ryan, Beacon, N.Y.

[73] Assignee: International Business Machines Corporation, Armonk, N.Y.

[21] Appl. No.: 09/177,385

[22] Filed: Oct. 23, 1998

[51] Int. Cl.⁷ ................................................. G06F 15/173
[52] U.S. Cl. ............................................ 709/227; 709/224
[58] Field of Search ................................ 709/227, 224, 709/228

[56] References Cited

U.S. PATENT DOCUMENTS

| | | | |
|---|---|---|---|
| 5,802,304 | 9/1998 | Stone | 709/227 |
| 5,812,784 | 9/1998 | Watson et al. | 709/227 |
| 5,828,840 | 10/1998 | Cowan et al. | 709/203 |
| 6,023,722 | 2/2000 | Colyer | 709/201 |
| 6,038,602 | 3/2000 | Ishikawa | 709/227 |
| 6,041,356 | 3/2000 | Mohammed | 709/227 |
| 6,052,779 | 4/2000 | Jackson et al. | 713/2 |

*Primary Examiner*—Krisna Lim
*Attorney, Agent, or Firm*—Whitman, Curtis, & Whitham; Stephen C. Kaufman, Esq.

[57] ABSTRACT

A wake up server permits both parties (the receiver and the responder) to be connected to the Internet only when a request or response is to be delivered. The wake up server consists of two parts; a server, which contains the telephone numbers of all machines (application partners) that dial to connect to the Internet, and on each application partner, a process monitor that monitors the telephone line and detects when a ring occurs. When an application partner is unable to deliver a request or response to another application partner, a request is sent to the wake up server to activate the target application partner. The wake up server dials the telephone number of the requested application partner and waits for ringing to occur. The wake up server then disconnects (i.e., hangs up the telephone line). The wake up monitor detects the ring and immediately dials to connect to the Internet. When the original application partner tries to send the response or request again, the process will now be successful. Application partners stay connected until a specified time of inactivity or other application initiated event signaling that the connection is no longer required. The application partners then activate their respective wake up monitors, which disconnect the application partners from the Internet and wait again for a ring from the wake up server.

14 Claims, 3 Drawing Sheets

SYSTEM WITH WAKE UP SERVER AND WAKE UP MONITOR FOR FACILITATING DIAL UP CONNECTION BETWEEN TWO APPLICATION PARTNERS VIA INTERNET

BACKGROUND OF THE INVENTION

1. Field of the Invention

The present invention generally relates to dial up connections between applications and, more particularly, to an efficient use of a dial up resource using the Internet.

2. Background Description

The Internet allows inexpensive connectivity for electronic commerce. Dial up connections are utilized to establish connectivity to the Internet and to transfer requests and responses. Responses to these requests cannot always be synchronous and may have to be delivered when one of the parties has "hung up" the connection. There is no way to return the response until the requester once again connects to the Internet. This does not allow applications to be responsive to new status unless connected to the Internet all the time. This can become very expensive.

SUMMARY OF THE INVENTION

It is therefore an object of the present invention to provide a way for establishing connectivity to the Internet which allows efficient utilization of the dial up resource, reducing both telephone line and Internet Service Provider connection costs.

According to the invention, there is provided a wake up server which permits both parties (the receiver and the responder) to be connected to the Internet only when a request or response is to be delivered. The wake up server consists of two parts; a server, which contains the telephone numbers of all machines (application partners) that dial to connect to the Internet, and on each application partner, a process monitor that monitors the telephone line and detects when a ring occurs. When an application partner is unable to deliver a request or response to another application partner, a request is sent to the wake up server to activate the target application partner. The wake up server dials the telephone number of the requested application partner and waits for ringing to occur. The wake up server then disconnects (i.e., hangs up the telephone line). The wake up monitor detects the ring and immediately dials to connect to the Internet. When the original application partner tries to send the response or request again, the process will now be successful. Application partners stay connected until a specified time of inactivity. The application partners then activate their respective wake up monitors, which disconnect the application partners from the Internet and wait again for a ring from the wake up server.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
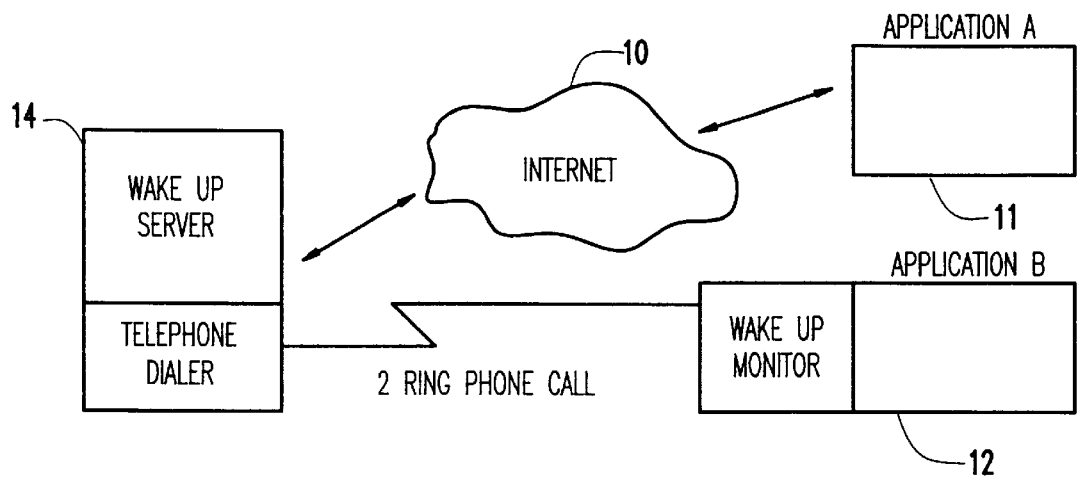
FIG. 1 is a generalized block diagram showing the relationship of the wake up server to two application partners.

Referring now to the drawings, and more particularly to FIG. 1, there is shown a block diagram that illustrates the process implemented by the present invention. Application 11 is connected to the Internet 10 and wants to send a response or request to application 12. However, application 12 is not currently connected to the Internet and the response or request fails. Application 11 then sends a request through the Internet 10 to the wake up server 13. The wake up server look up the telephone number of application 12 and then dials, waiting typically for two rings. The wake up server 13 then disconnects. Meanwhile, the wake up monitor 14 for application 12 detects the ring from the wake up server. The wake up monitor 14 then initiates a dial up sequence to connect application 12 to the Internet 10.

Figure 2:
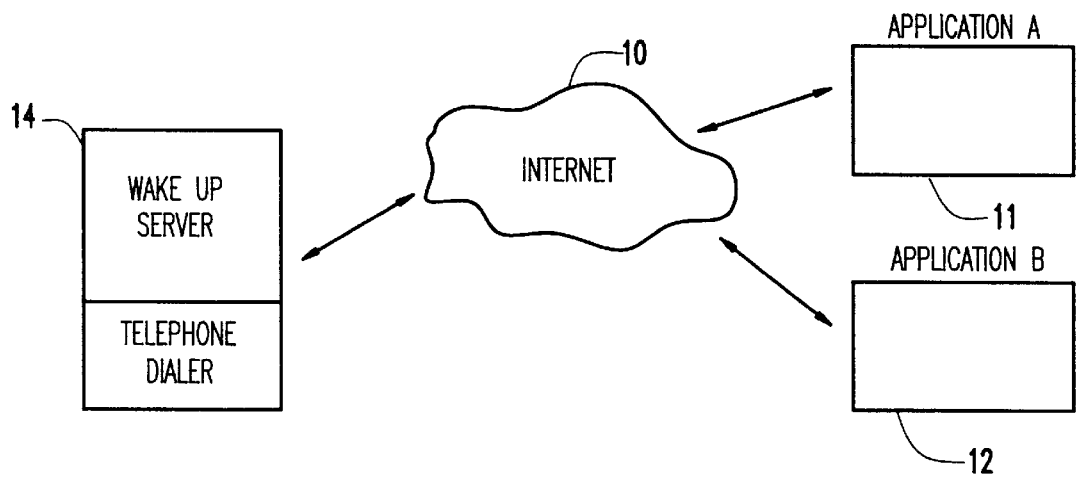
FIG. 2 is a generalized block diagram similar to FIG. 1 showing the result of a telephone call from the wake up server to one of the two application partners.

FIG. 2 shows application 12 connected to the Internet 10. Now, when application 11 re-sends the response or request to application 12, it will be successful because application 12 is connected to the Internet. The two applications 11 and 12 remain connected via the Internet until there is a specified time of inactivity or other application initiated event signaling that the connection is no longer required. The wake up monitors for each of the applications disconnect the Internet connection when this period of inactivity is detected and return to a wait condition for a ring from the wake up monitor 13.

Figure 3:
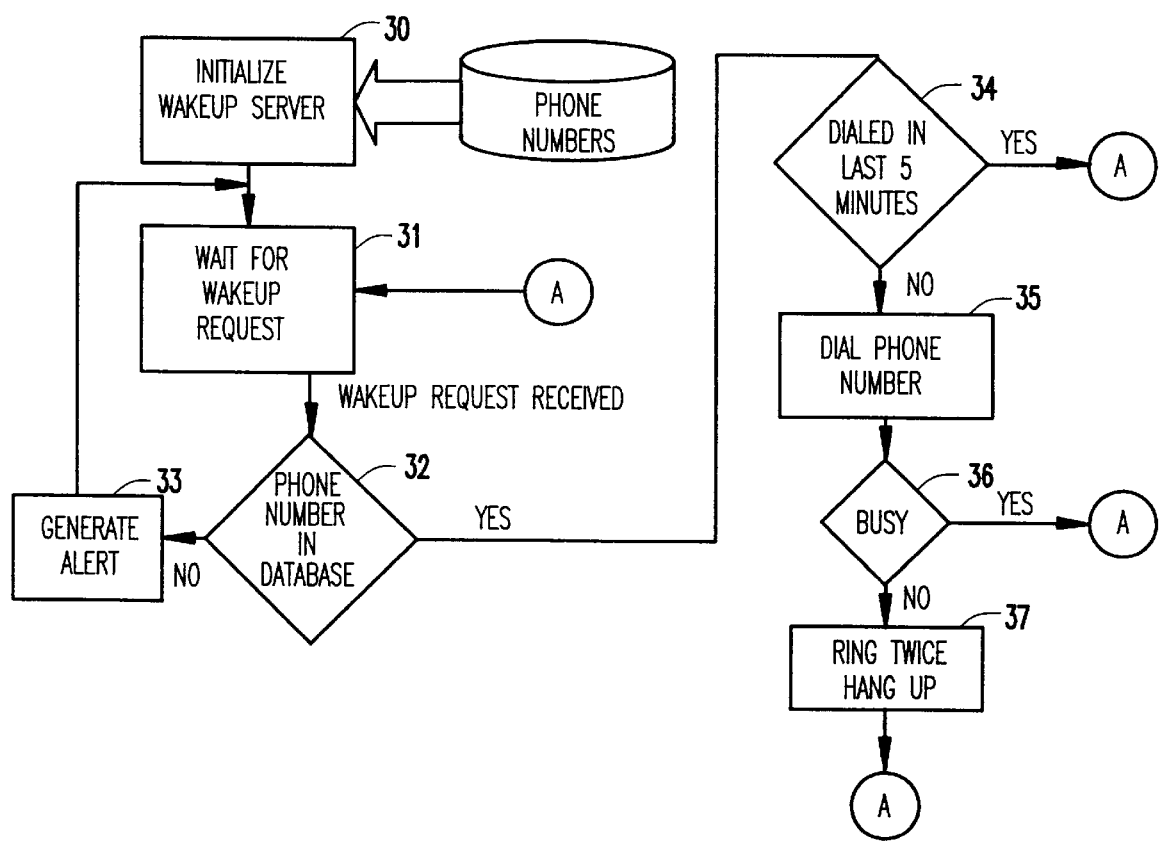
FIG. 3 is a flow diagram of the process implemented on the wake up server.

FIG. 3 shows the logic utilized by the wake up server. At initialization in function block 30, the server name and telephone number database is read and communication parameters are initialized. The database may be either local (e.g., attached to the wake up server) or remote (e.g., accessed via the Internet or other network). The server then waits in function block 31 to receive a request from an application to "wake up" a specified application. The requested application is then looked up in the data base at decision block 32. If it is not found, an alert is generated to notify operations that an application is missing from the database in function block 33. If the application is found in the database, then a check is performed in decision block 34 to see if that application has been requested before in the last five minutes. If so, then no further action is required, and the process loops back to function block 31 to wait again for a wake up request. If not, then the telephone number is dialed in function block 35. If a busy signal is received as determined in decision block 36, then no further action is required, and again the process loops back to function block 31. However, if ringing occurs, then two rings are generated and the line is hung up in function block 37. The process then loops back to function block 31 to await the nest request.

Figure 4:
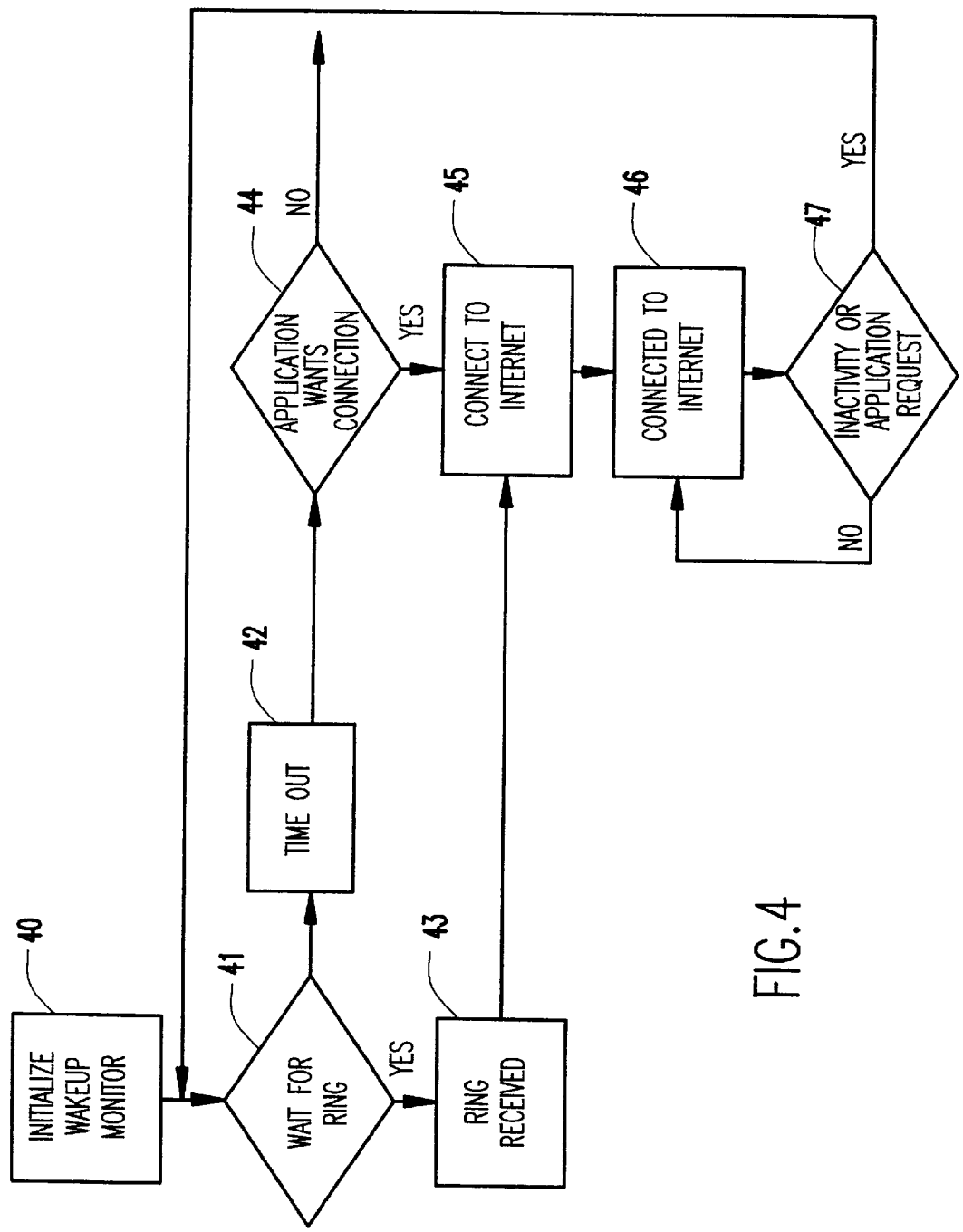
FIG. 4 is a flow diagram of the process implemented on the wake up monitor.

FIG. 4 shows the logic utilized by the wake up monitor. At initialization in function block 40, the wake up monitor reads the communication parameters and then waits for a ring in decision block 41. If a ring does not occur in a specified interval, a time out occurs in function block 42. At this time, the monitor checks in decision block 44 to see if the local application wants to connect to the Internet. If so, then a connection is established in function block 45. If a ring is received as detected in function block 43, then the wake up monitor proceeds to connect the application to the Internet in function block 45.

Once connected to the Internet in function block 46, the wake up monitor checks in decision block 47 for a specified period of inactivity or a request from the application to disconnect from the Internet. When either condition occurs, the wake up monitor disconnects the application from the Internet. The process then loops back to decision block 41 to wait for a ring or the time out period to elapse.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A system for facilitating dial up connections between two application partners through the Internet, the system comprising:

a wake up server connected to the Internet;

a database accessed by the wake up server and containing telephone numbers of all application partners; and a wake up monitor on each application partner that monitors a telephone line and detects when a ring occurs;

when a first application partner is unable to deliver a request or response to a second application partner, a request is sent by the first application partner to the wake up server to activate the second application partner, the wake up server in response dials a telephone number of the second application partner and waits for ringing to occur before disconnecting, the wake up monitor for the second application partner detects the ring and dials to connect the second application partner to the Internet so that when the first application partner tries to send the response or request again to the second application partner, the process will now be successful.

2. The system recited in claim 1 wherein the request sent by the first application partner to the wake up server to activate the second application partner is sent via the Internet.

3. The system recited in claim 1 wherein the wake up server dials a direct dial telephone number of the second application partner.

4. The system recited in claim 1 wherein the request sent by the first application partner to the wake up server to activate the second application partner is sent via the Internet and the wake up server dials a direct dial telephone number of the second application partner.

5. The system recited in claim 1 wherein, once an application partner is connected to the Internet, the wake up monitor for an application partner monitors a time period of inactivity while the application partner is connected to the Internet.

6. The system recited in claim 5 wherein when the time period of inactivity is detected, the wake up monitor disconnects the application partner from the Internet.

7. The system recited in claim 5 wherein when the time period of inactivity is detected or other application initiated event signaling that the connection is no longer required, the wake up monitor disconnects the application partner from the Internet.

8. A method of facilitating dial up connections between two application partners through the Internet, the method comprising the steps of:

connecting a wake up server to the Internet;

accessing by the wake up server a database containing telephone numbers of all application partners;

monitoring with a wake up monitor on each application partner a telephone line to detect when a ring occurs;

sending a request by a first application partner to the wake up server to activate a second application partner when the first application partner is unable to deliver a request or response to the second application partner;

dialing by the wake up server a telephone number of the second application partner and waits for ringing to occur before disconnecting; and detecting by the wake up monitor for the second application partner the ring and dialing to connect the second application partner to the Internet so that when the first application partner tries to send the response or request again to the second application partner, the process will now be successful.

9. The method recited in claim 8 wherein the step of sending a request by the first application partner to the wake up server to activate the second application partner sends the request via the Internet.

10. The method recited in claim 8 wherein the step of dialing by the wake up server dials a direct dial telephone number of the second application partner.

11. The method recited in claim 8 wherein the step of sending a request by the first application partner to the wake up server to activate the second application partner sends the request via the Internet and the step of dialing by the wake up server dials a direct dial telephone number of the second application partner.

12. The method recited in claim 8 further comprising the step of monitoring a time period of inactivity while the application partner is connected to the Internet once an application partner is connected to the Internet.

13. The method recited in claim 12 further comprising the step of disconnecting the application partner from the Internet by the wake up monitor when the time period of inactivity is detected.

14. The method recited in claim 12 further comprising the step of disconnecting the application partner from the Internet by the wake up monitor when the time period of inactivity is detected or other application initiated event signaling that the connection is no longer required.

\* \* \* \* \*